US005976292A

United States Patent [19]

Barksdale et al.

[11] Patent Number: 5,976,292

[45] Date of Patent: Nov. 2, 1999

[54] ROOFING SEAM INSTALLATION PROCESS AND PRODUCTS FOR THE PRODUCTION OF A SEAMED ROOF

[75] Inventors: Daniel L. Barksdale, Brownsburg; James E. Burkett; Joseph J. Kalwara, both of Indianapolis; James L. Hoff, Brownsburg, all of Ind.

[73] Assignee: Bridgestone/Firestone, Inc., Akron, Ohio

[21] Appl. No.: 08/944,605

[22] Filed: Oct. 6, 1997

Related U.S. Application Data

[60] Continuation-in-part of application No. 08/591,049, May 6, 1996, abandoned, which is a division of application No. 08/129,226, Sep. 29, 1993, Pat. No. 5,520,761.

[51] Int. Cl.[6] .......... B32B 31/12

[52] U.S. Cl. .......... 156/157; 15/229.13; 156/71; 156/281

[58] Field of Search .......... 156/71, 157, 281, 156/309.3, 306.6, 307.3, 315; 15/116.2, 147.1, 147.2, 229.13

[56] References Cited

U.S. PATENT DOCUMENTS

| | | | |
|---|---|---|---|
| 1,593,922 | 7/1926 | Viragh . | |
| 1,660,351 | 2/1928 | Pataki . | |
| 2,620,501 | 12/1952 | Bailey . | |
| 3,090,065 | 5/1963 | Krieps et al. . | |
| 3,473,184 | 10/1969 | Buck | 15/229.13 |
| 3,634,901 | 1/1972 | Landsberg . | |
| 3,755,066 | 8/1973 | Rose . | |
| 3,991,431 | 11/1976 | Thielen | 15/147.2 |
| 4,204,295 | 5/1980 | O'Connor | 15/229.13 |
| 4,281,037 | 7/1981 | Choung . | |
| 4,414,700 | 11/1983 | Burns . | |
| 4,437,283 | 3/1984 | Benoit . | |
| 4,450,252 | 5/1984 | Fieldhouse . | |
| 4,480,012 | 10/1984 | Fieldhouse . | |
| 4,501,842 | 2/1985 | Chmiel et al. . | |
| 4,588,637 | 5/1986 | Chiu . | |
| 4,589,804 | 5/1986 | Paeglis et al. . | |
| 4,601,935 | 7/1986 | Metcalf et al. . | |
| 4,767,653 | 8/1988 | Renstrom . | |
| 4,849,268 | 7/1989 | Backenstow et al. . | |
| 4,855,172 | 8/1989 | Chiu . | |
| 4,885,887 | 12/1989 | Simmons et al. . | |
| 4,897,137 | 1/1990 | Miller . | |
| 4,897,293 | 1/1990 | Thessen . | |
| 4,936,071 | 6/1990 | Karrfalt . | |
| 5,084,119 | 1/1992 | Barksdale . | |
| 5,106,808 | 4/1992 | Boeder . | |
| 5,204,148 | 4/1993 | Alexander et al. . | |
| 5,249,961 | 10/1993 | Hoagland . | |
| 5,319,824 | 6/1994 | Cook | 15/144.1 |
| 5,331,784 | 7/1994 | Agrawal . | |
| 5,470,605 | 11/1995 | Lundeen . | |
| 5,520,761 | 5/1996 | Kalwara | 156/157 |

FOREIGN PATENT DOCUMENTS

| | | |
|---|---|---|
| 0044063 | 8/1908 | Switzerland . |
| 0047647 | 5/1909 | Switzerland . |

OTHER PUBLICATIONS

1. "Guidelines for Using PLIOSEAL® 408 Sealant–Adhesive Products," Document No. SEG 91–101, published Aug. 1991, by Ashland Chemical, Inc., Specialty Polymers and Adhesives Division, 1745 Cottage Street, Ashland, Ohio 44805.

*Primary Examiner*—Daniel Stemmer
*Attorney, Agent, or Firm*—Daniel N. Hall

[57] ABSTRACT

A process for preparing a lap seam for roofing comprising applying a butyl rubber-containing primer with a mesh pad to the EPDM membrane surfaces to be joined. The primer is applied with a long-handled applicator to permit the roofer to stand during priming. Thereafter a splice tape is positioned between the primed surfaces to form a seam structure and pressure is applied to the structure thus provided to form an adhesively-held lap seam characterized by being watertight and having superior peel strength when compared to other methods of making seam tapes.

4 Claims, 4 Drawing Sheets

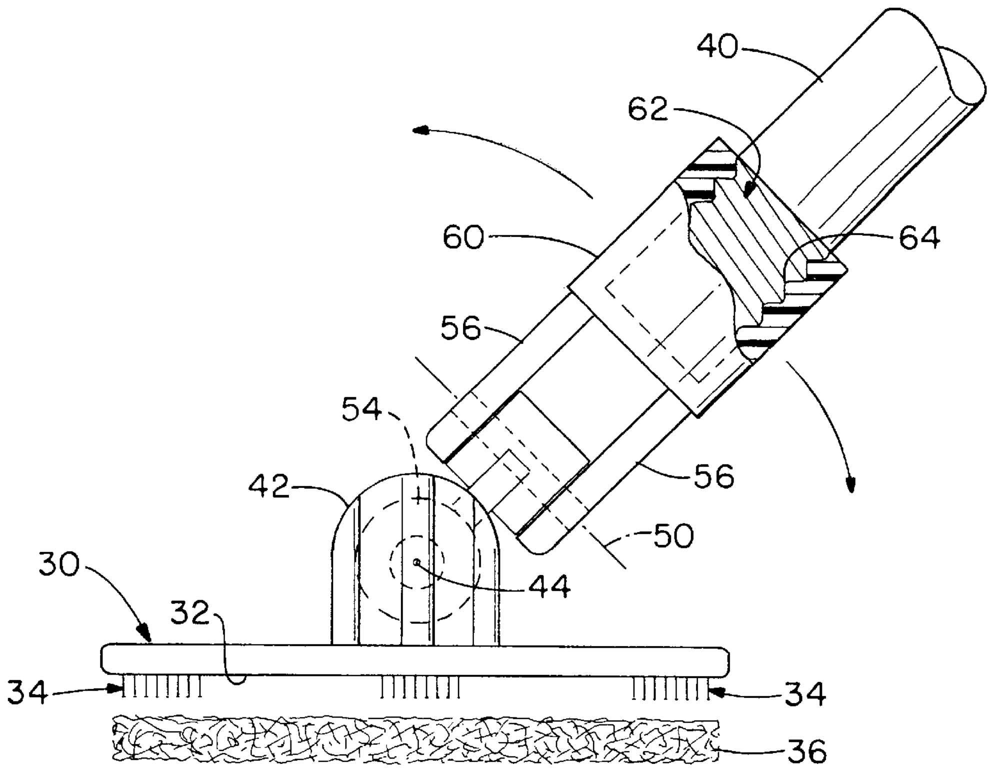
FIG.-5
FIG.-6
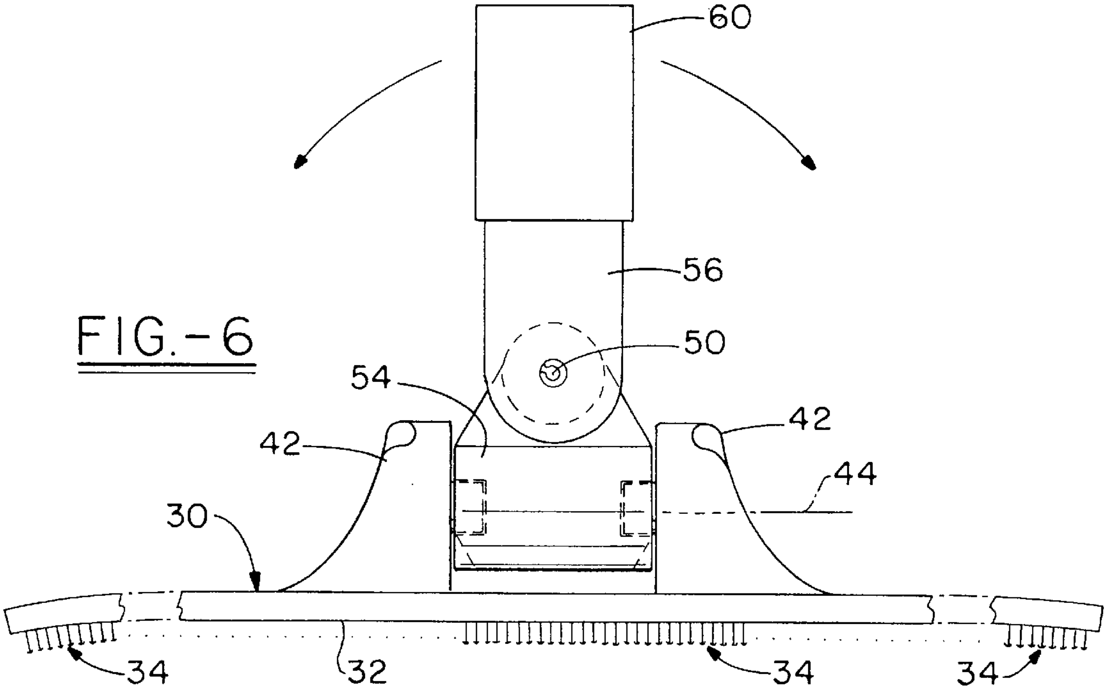

ROOFING SEAM INSTALLATION PROCESS AND PRODUCTS FOR THE PRODUCTION OF A SEAMED ROOF

CROSS-REFERENCE

This application is a continuation-in-part of pending U.S. patent application Ser. No. 08/591,049, filed May 6, 1996, now abandoned, entitled "Roofing Seam Installation Process," by inventors Joseph J. Kalwara, Daniel L. Barksdale, and James L. Hoff, now abandoned which in turn is a division of U.S. patent application Ser. No. 08/129,226, filed Sep. 29, 1993, entitled "Roofing Seam Installation Process," inventors Joseph J. Kalwara; Daniel L. Barksdale, and James L. Hoff, which issued as U.S. Pat. No. 5,520,761, on May 28, 1996.

TECHNICAL FIELD

This invention relates to waterproof roofing systems fabricated with elastomeric membranes. More particularly, this invention relates to an improved method for preparing watertight lap seams for rubber membranes with which the seams come in contact as a result of their exposure to the elements and from other sources. Specifically, this invention relates to EPDM membranes joined by lap seams in which the seaming system includes primers having elastomeric solids which are applied to the membrane by mesh pads, and which employs adhesive seam tapes to obtain waterproof seals throughout the seam joint. In a further embodiment, a method is used in which the roofer has an applicator with a long handle which changes the roofing process by permitting the roofer to spend time standing during the seaming process (and in particular during the priming) while achieving seam adhesion which is substantially comparable to that achieved when the roofer works in a kneeling position.

BACKGROUND OF THE INVENTION

The use of roofing systems capable of successfully maintaining their integrity, particularly their ability to prevent the entry of water resulting from their exposure to rain, snow, or other causes is a fundamental requirement for any successful building structure, particularly roofing in connection with flat or low-slope roofs installed on commercial, institutional, and industrial buildings.

In the past, a variety of roofing systems have been used in connection with such buildings including, for example, metal panel roofing. Such roofing usually consists of metal panels overlapped at their ends and secured to the roofing decks of building structures with nails, screws, clips or other fasteners. However, while metal panels are relatively durable, the panels are subject to significant thermally induced contractions and expansions due to ambient temperature variations, a characteristic that often leads to the cracking of such roofing, especially along the roof seams and fastener locations, with leakage occurring as a result thereof.

Another type of roofing commonly employed for such buildings is the so-called built-up roofing system. The latter type of roofing depends upon the application of asphaltic compounds to secure felt or other membranes over suitable insulation attached over metal roof decking. While such systems are often used, they can be relatively expensive to provide, and again thermal contraction and expansion of the roofing system can result in cracking of the roof covering along its seams and fastener locations, resulting in roof leakage.

The latter type of roofing also undesirably increases the weight of the roofing surface, which can add unwanted stress to buildings on which such roofing is installed. Additionally, the use of hot asphalt is sometimes prohibited by local building codes. Finally, built-up roofing systems typically eventually require retrofit roofing installations and these can be difficult to provide in view of the fact that they sometimes necessitate the provision of intermediate foundation layers, such added layers creating further roofing support problems. In fact, not uncommonly, these retrofit installations can result in the shifting of the roofing deck itself, movement which causes still more cracks and further leakage.

In order to overcome the foregoing and other problems associated with such roofs, resort has increasingly been had to the use of roofing membranes formed from ethylene/propylene/non-conjugated diene rubber, EPDM, membranes. In this regard, EPDM membranes have proven to be admirably suited for roofing systems since they have a long life, substantial flexibility and retain their resiliency at very low temperatures. They are also distinguished by their ability to withstand the high temperatures frequently encountered in roofing environments without unduly stretching or softening, and by their possession of a high order of resistance to ultraviolet light. EPDM elastomers are usually blended with fillers, coloring agents, extenders, crosslinking agents and antioxidants to form compounded rubbers that are then calendered or extruded into sheets or membranes, typically about 7 to 40 feet wide, and 100 or more feet long.

In many roofing installation situations in which such membrane sheets are employed, however, it becomes necessary to overlap (i.e., adjacently position) a number of the sheets in watertight splices to obtain the required complete roof-top coverage. In one such splicing system, the procedure involves thoroughly cleaning the surface of the membranes to be joined in an overlapped seam. Such cleaning is required in order to remove the talc or mica dusting used by manufacturers to keep the membrane surfaces from sticking together in the rolls in which they are marketed. Cleaning is typically done by a roofer on hands and knees who vigorously scrubs the surface to be joined with a rag wetted with hexane, naphtha, gasoline or some other similar material. Thereafter, a membrane adhesive, commonly consisting of a 25–30 percent by weight solution of rubber in a suitable solvent is brushed over the surfaces to be adhered. Following drying of the contained solvent, the surfaces are joined and pressed together to form the desired seam. In some instances, a "primer" consisting of a dilute solution of rubber in a suitable solvent is applied to the surfaces to be joined prior to application of the membrane adhesive in order to improve the final seam adhesion. Thereafter, lap-edge caulking is often added to the overlapped edges of the seam in order to protect the finished seam.

While the system described is conceptually simple, in practice it suffers from being both labor and material-intensive, and it also results in relatively low seam peel strengths. Furthermore, for environmental and health reasons it is undesirable, and increasingly unlawful in specific air quality management districts, to use a system that employs so much volatile organic compound (VOC) in the form of required components.

Partially to reduce the amount of VOC's, as well as to improve seam strengths, an alternative system has relied upon so-called seam tapes to obtain the necessary adhesion. Seam tapes, as the name implies, are tacky strips of adhesives commonly formed from butyl or other rubbers, which are compounded to include rubber tackifiers and other agents required to impart adhesive qualities.

The seaming process entails the initial cleaning of the surfaces to be joined with a liquid organic cleaner-impregnated rag to remove anti-stick dusting powders. Following such cleaning, a dilute seam primer containing from about 5 to 9 percent by weight of rubber in a solvent therefor is applied to the membrane seam overlap surfaces. Following drying, tape is applied over the primed surfaces and pressure is applied to the seam to secure the necessary joinder.

While the use of seam tape eliminates the VOC's which would otherwise be present as a consequence of the solvents in seam adhesives, the need to clean the surfaces with liquid organics and the relatively large amount of solvents present in the very dilute primer make the escape of large amounts of VOC's to the atmosphere unavoidable. In addition, the need to perform both a cleaning process as well as a priming operation necessarily results in relatively high installation costs as a result of the additional labor and material required.

An additional shortcoming to the state of the art in the roof seaming industry is that a roofer performs virtually all operations in a kneeling position. It is an advantage to develop equipment which changes the process to allow the roofer to be relieved from this tiresome and potentially harmful posture.

In view of the foregoing it is therefore a first aspect of this invention to provide a process for installing membrane roofing seams which eliminates any need to perform a separate cleaning step.

A second aspect of this invention is to provide a process for installing seams in membrane roofing systems using seam tapes that utilize primers containing lower amounts of volatile organic compound materials.

A further aspect of this invention is to provide roofing seam primers whose application to the roofing membranes obviates the need to initially clean the surfaces to be joined.

An additional aspect of this invention is to provide roofing primers whose application to roofing membranes also serves to clean the areas of membranes to be joined.

Another aspect of this invention is to reduce the amount of volatile organic compound materials that are available to enter the atmosphere.

Yet a further aspect of this invention is to provide roofing seam primers and a method for their application that increases the peel strength of the membrane roofing seams prepared therewith.

Still another aspect of this invention is to provide a method for installing seams in membrane roofing systems which reduces installation costs as well as the amount of fill material needed for low areas, step-offs, etc., to provide a smooth surface for receiving seam tape.

In another embodiment, an additional aspect of the invention is to provide a membrane pre-adhered to a seam tape having a release backing for use with the process of the present invention in roofing installations.

In yet another embodiment, an additional aspect of the invention is to provide a method of seaming a roof utilizing an applicator having an elongated, upright, swivel handle attached to a bearing surface which holds a scrub pad such that the primary step may be performed in a standing position or not.

BRIEF DESCRIPTION OF THE INVENTION

The preceding and other aspects of the invention are provided by a process for preparing seams joining adjacent membrane roofing sheets together, the seams being formed by the joinder of a portion of the upper surface of one of the sheets to a portion of the lower surface of the other sheet. In the process, a mesh pad is used to prime both such surfaces with a primer comprising a butyl rubber-containing material dissolved in a hydrocarbon solvent, one suitable primer containing from about 15 to 20 percent by weight of elastomeric solids. A splice tape comprising a strip of rubber that includes rubber tackifiers is then placed on the primed upper surface, following which the primed lower surface of the other sheet is placed on top of the tape to form the desired splice.

The preceding and additional aspects of the invention are provided by a liquid primer material for preparing seams in membrane roofing systems employing seam tapes comprising a butyl rubber-containing elastomer; a poly- isocyanate-containing curing agent; and a hydrocarbon solvent for the polymeric material and the curing agent. The primer material preferably contains from about 15–20 percent by weight of elastomeric solids.

The preceding and further aspects of the invention are provided by an EPDM membrane roof installed according to the process of the preceding paragraph.

The mesh pad is removably attached to the bearing surface of an applicator handle means having a hand-grip spaced apart from and above the bearing surface or an elongated broom handle which is pivotally attached to the bearing surface.

BRIEF DESCRIPTION OF THE DRAWINGS

The invention will be better understood when reference is had to the following figures in which like numbers refer to like parts, and in which:

FIG. 5 is a side elevational view of a first embodiment for a scrub pad holder having a universal joint and handle holder;

FIG. 6 is a frontal view of the scrub pad holder illustrated in FIG. 5 with the handle holder in a vertical position.

DETAILED DESCRIPTION OF THE INVENTION

Sheets of EPDM roofing membrane are often prepared by a double calendering process in which two sheets of uncured material are pressed together by rollers to form a single sheet, the composite single sheet then being coated with talc or mica to prevent contacting surfaces from sticking together, wound into a roll and cured. At the site of the roofing installation, the membrane is unrolled and joined, for example, by lap seaming, the seaming method with which this invention is concerned.

In any of several ways of preparing EPDM roofing seams, it is necessary that the talc or mica anti-stick agents be removed from the membrane surface prior to applying whatever adhesive system is to be used to join adjacent membrane sheets together. If the removal process is not thorough, the particles of talc or mica, as the case may be, prevent the adhesive material employed from thoroughly coating the surface area covered by the anti-stick agent. This then results in inferior adhesion, subsequent decoupling of the joint, and eventual penetration of water through the seam.

In order to avoid this result, and as previously mentioned, the practice of the prior art is first to clean the areas of the membrane sheets which are to be joined in a seam with a cloth wetted with some suitable organic cleaning material, and a joinder adhesive being applied thereafter. It has now been discovered, however, that the anti-stick agents may be removed and the joinder adhesive applied simultaneously through employment of a primer having from about 5 to about 30 percent elastomeric solids content, used in conjunction with a mesh pad applicator. The application process entails saturating the mesh pad with the primer, for example by dipping it in the primer, and applying the saturated pad to the surfaces to be joined. The contact of the mesh pad with the membrane surface scrubs and scours the surface during the coating process, dislodging the anti-stick agent which is then caught-up and suspended in the primer-saturated pad, leaving the newly cleaned surface coated with the primer.

The use of an appropriate primer with the pad shows an ability to suspend the anti-stick agents in an entrapped condition within the pad and pick-up of the primer in the mesh pad to a satisfactory degree during the dipping process.

The primer-saturated pad scrubs the surface to be seamed, dislodging the anti-stick agents and entrapping them in the mesh, and simultaneously leaves a satisfactory coating of adhesive on the membrane surface.

Figure 1:
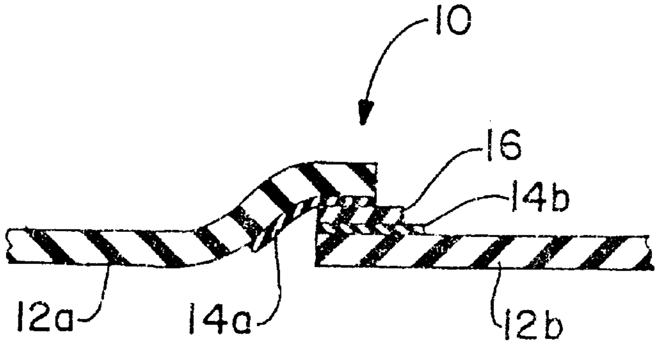
FIG. 1 is a side elevation of a roofing membrane sheet lap seam.

FIG. 1 is a side elevation of a roofing membrane sheet lap seam, generally 10. As shown in this figure, two adjacent membrane sheets, 12*a* and 12*b*, are connected in an overlapping joinder seam. The upper surface of membrane 12*b* is coated with a layer of primer 14*b*, while membrane 12*a* is similarly coated with a layer of primer 14*a*. Interposed between the primer layers 14*a* and 14*b* is a splice tape 16. While equivalent methods may be employed, the following illustrates installation of the seam.

Two sheets are placed in an adjacent, side-by-side relationship, the edges overlapping by the desired seam amount, for example, from about 3 to 5 inches. A portion of the upper sheet is then folded back over itself and temporarily held in that position, for instance, by the application of primer to form "tacking points" every 4 to 6 feet along the seam. The fold-back area will typically be about 1 foot wide. Primer is then poured into a pail or bucket and the mesh pad is dipped therein and held horizontally so that no primer drips out prematurely as the pad is removed therefrom. The primer is applied to the lower surface of the folded-back membrane and to the upper surface of the other membrane, using long back-and-forth strokes with moderate to heavy pressure along the length of the splice area until the surfaces have acquired a coating of primer with no apparent streaking or puddling. A deposit of primer from about 3 to 5 mils thick, for example, will give satisfactory adhesion. Fresh scrubbing pads are substituted for previously used pads about every 200 feet of application, or when the primer has dried, leaving the pad compressed.

The primer is thereafter allowed to dry completely, usually requiring a period of less than 10 minutes, after which a strip of splice tape is applied to the primed upper surface of the membrane forming the lower portion of the seam. The splice tape, which is typically furnished in a roll as a laminate comprising the tape itself and a layer of release paper, is positioned with the release paper facing upwardly. Pressure is then applied, for example by a roller, to the release paper surface of the tape, firmly bonding the primed surface of the lower membrane to the exposed lower surface of the tape. Thereafter, the top membrane is untacked, allowing it to fall over the release paper on the tape, but with a portion of the release paper extending visibly past the seam edge. The release paper is then pulled outwardly, away from the seam, thereby bringing the primed surface of the upper membrane into direct contact with the now exposed upper surface of the release tape. Finally, pressure is applied to the upper membrane along the entire seam area, conveniently with a hand-held roller, to achieve a finished seam.

Primers of the invention comprise a butyl rubber-containing polymer base together with a curing system, the two being dissolved in a suitable solvent. The primers may also advantageously contain a small amount of a pigment such as carbon black to make them readily visible when coated on membrane surfaces and to differentiate them from other roofing adhesives.

Butyl rubbers comprising copolymers of isobutylene and isoprene can, for example, have an unsaturation of from about 0.6 to 2.5 mole percent. The rubbers will usually have a raw Mooney viscosity of ML 1+8 at 212° F. of from about 18 to 75. Brominated and chlorinated butyls are also suitable for purposes of the invention and, in this regard, they may contain from about 1 to about 1.5 weight percent of bromine or chlorine. Mixtures of the preceding, which may include some uncured rubber, can also be satisfactorily employed.

In order to develop the necessary physical properties in cases where the primer mixture contains uncured rubber, a curing agent is provided in the primer which has the ability to promote substantial curing of the uncured rubber within a matter of hours under typical ambient roofing conditions. In this connection and although other cure systems might be employed, in a preferred embodiment it has been found desirable to incorporate diisocyanate curing systems in amounts of from about 0.2–0.5 percent, on a weight basis, in the primer mixture. Also, in a preferred embodiment, it has been found desirable to employ oligomers of alkyl diisocyanates in the primer, particularly trimers of 1,4-hexane diisocyanate. Such curing systems react with the water adventitiously present to form amines which subsequently interact with the butyl rubber polymer system. Irrespective of the nature of the curing system, however, it should be soluble in the primer mixture.

The solvents in which the butyl rubber and curing agents are dissolved may include any of a number of organic solvents, for example heptane, toluene, xylene, as well as mixtures thereof.

There appears to be a synergy between the use of the method of the present invention and a preferred solids weight primer, i.e., 5 to 50 percent, preferably 5 to 30 percent, more preferably 15 to 20 percent, and more advantageously between about 15 to 16 percent. However, the invention process is effective and encompasses use of primers of various percent solids.

A typical primer composition might, for instance, contains the following materials in the amounts shown.

| COMPONENT | AMOUNT (BY WEIGHT) |
|---|---|
| Butyl Rubber Base Polymer | Approx. 16% |
| Polyisocyanate Trimer | 0.5% |
| Heptane | 45.4% |
| Toluene | 35.6% |
| Xylene | 2.9% |

Figure 2:
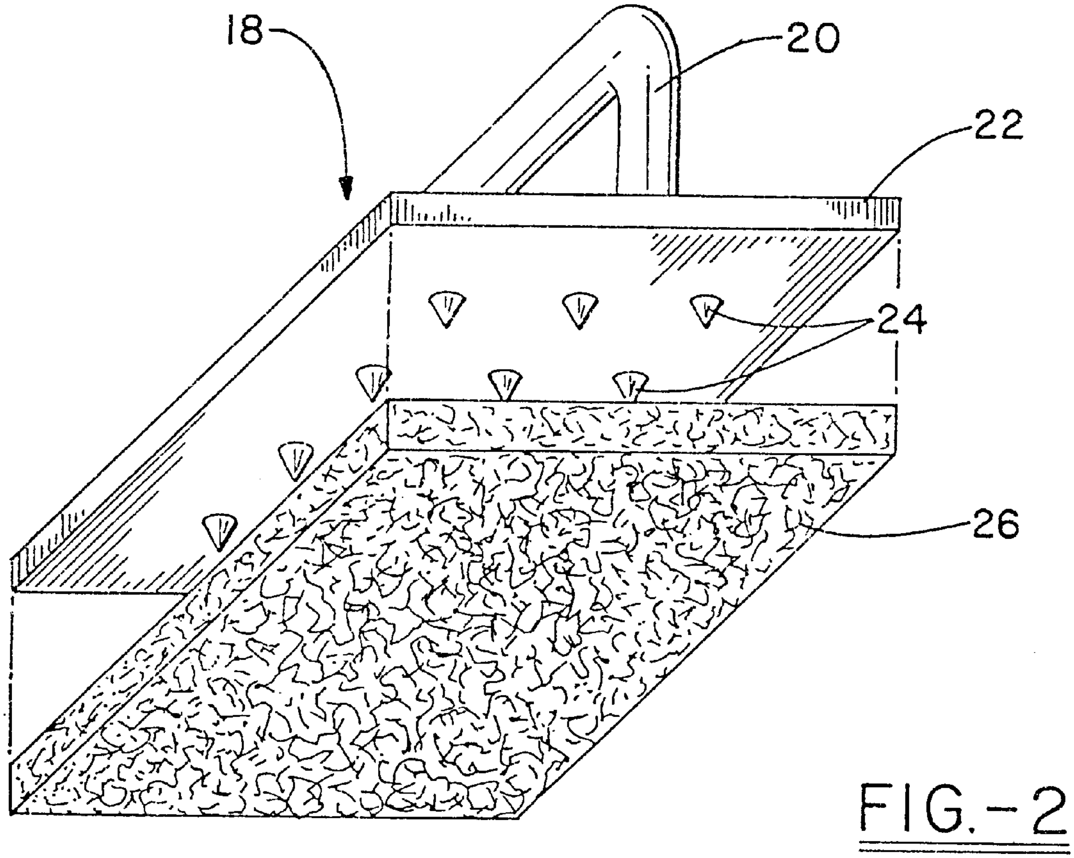
FIG. 2 is an exploded isometric view of a mesh primer applicator pad and a holder therefor.

The mesh pads suitable for purposes of the invention may conveniently take the form of that of FIG. 2, which shows an exploded isometric view of a mesh primer applicator pad and a holder therefor. As shown in the figure, the mesh pad 26 can be secured to an applicator, generally 18, by being impaled on retaining cleats 24, which are fastened or molded to the underside of applicator base plate 22. The applicator 18 is held and manipulated by grasping handle 20, attached to base plate 22. After a pad has become ineffective for any of the reasons previously described, it is simply lifted from the cleats and a new pad installed thereon.

The mesh pads contemplated by the invention may comprise any pad having a mesh formed from woven or non-woven filamentary material, for example, cellulosic or plastic materials. A suitable pad for purposes of the invention is, for instance, Scotch-Brite™ General Purpose Hand Pad No. 7447, marketed by 3M Company, although other equivalent products may also be used. The Scotch-Brite™ pads are typically formed from non-woven synthetic fibers to which an abrasive mineral is bonded by means of a polymer adhesive to form a web that is tough, open, chemically resistant, conformable and long-lasting. When such pads are made from a plastic, e.g., nylon, they resist tearing, splintering and shredding.

Splice tape of the type useful for purposes of this invention comprises a tape strip, commonly about 2 to 4 inches wide, and from about 25 to 50 mils thick. One side of the tape is covered by release paper of the type well known in the art to keep adjacent surfaces of the tape from sticking to each other. The tapes include rubbers such as butyl rubber and contain tackifiers to enhance their tackiness. Such tapes are taught, for example, in U.S. Pat. Nos. 4,426,468; 4,539,344; 4,588,637; and 4,855,172, the teachings of which are incorporated herein by reference.

While seams of the type described herein may be used in conjunction with any rubber membrane with which the primers of the invention form adhesive bonds, the invention is particularly useful in conjunction with roofing made from EPDM membranes, and when so used it provides seam bonds markedly superior to those of the prior art, as evident from the following table. The values shown in the table reflect testing by the method of ASTM D-1876 after the seam samples tested were exposed to hot and cold cycling in accordance with the Rubber Manufacturers' Association procedure RP-10, "Minimum Peel Strength Requirements For Adhesives Used In Seaming Black EPDM Sheets," which procedure is incorporated by reference herein. Tests 1 and 2 describe peel strengths of seams prepared according to the prior art in which EPDM membranes are coated with a primer containing 9 percent, by weight, of elastomeric solids applied with a rag. The last two tests, 3 and 4 respectively, describe peel strength values in which, however, a primer containing 15 percent by weight of elastomeric solids was applied using an open-mesh pad. The standard EPDM samples differed from those identified as being reinforced in that the latter incorporated scrim reinforcement in the membranes.

| TEST | SAMPLE TYPE | PEEL STRENGTH (lbs./inch) |
|---|---|---|
| 1 | Standard | 7.6 |
| 2 | Reinforced | 7.5 |
| 3 | Standard | 12.1 |
| 4 | Reinforced | 16.0 |

The preceding tests in which the systems tested are comparable except for the elastomeric solids content of the primer and its method of application, clearly demonstrate the superior seam strengths that can be obtained using the method of the invention.

The membranes seamed by the method of the invention can be fastened to roofs over which they are positioned by any of the well known systems, for example, by contact adhesives, with battens and/or screws, with ballasting, or in other ways.

In a further embodiment, the process of the present invention is used to join two roofing membranes in the field (i.e., in a roof installation) where one of the membranes has been pre-adhered (e.g., in a factory) to a seam tape. For example, one of the membranes could be prepared such as by priming with an appropriate primer and then adhered (as previously described) to a seam tape which advantageously includes a release paper on the opposite side.

The factory-prepared membrane may correspond exactly to the previously described membranes with the exception of the pre-adhered tape or may further be smaller membranes of the same composition for specialized applications. For example, membranes having a width of from about 5 inches to about 3 feet, preferably about 5 inches to about 18 inches, and most preferably about 3 inches to about 12 inches. The membranes can have a planar configuration such as for batten strips with a width of about 4 inches to about 6 inches which are adhered to the exposed surface so as to have adjacent overlapping planar surfaces, i.e., the strip is adhered to the top of the membrane such as to cover steel or plastic batten strips. Alternatively, the membrane can have a more complex cross-sectional configuration such as L-shaped flashing strips.

In accordance with the invention, the factory-prepared membrane is transported (as in a roll) to the field preparation site such as, for example, to a roofing installation. The adhesion location on a membrane top surface is prepared as previously described by applying primer. The primer is loaded in the applicator pad by dipping the pad mounted on a rigid handle into a bucket which contains the primer. The installer grips the hand-grip which is spaced from the applicator pad enabling the fibrous pad to be saturated with primer without getting primer on the installer's hand. The primer is applied to the membrane in broad, even strokes with the planar bearing surface to permit the application of an even pressure, and subsequently allowed to dry. The release paper is peeled from the seam tape and the tape is contacted with the primed surface. Pressure is applied and the pre-adhered membrane is adhered to the field membrane.

In accordance with a further embodiment of the invention a scrub pad applicator is illustrated in FIGS. 3–7. Specifically, a scrub pad applicator 30 is shown which includes a bearing surface 32 including retaining cleats 34 which secure a scrub pad member 36 to the bearing surface 32. In particular, as can be seen in FIG. 6, the bearing surface 32 includes a slight arch along the longitudinal direction which is approximately one-eighth (1/8) inch vertical rise for a bearing surface which is 6–10 inches, and more preferably around 8 inches in length and from 3 to 5 inches in width. The rise allows the bearing surface to be bent into the scrubbing area by the application of pressure through the handle 40 as the handle bears directly upon the high point of the rise. The handle holder includes a bearing axis 44 to enable a handle to be pivoted about an axis which is parallel to the long direction of the applicator bearing system. The handle includes an additional axis of rotation 50 spaced from the journal member 54 by brackets 56 and including an axis of rotation 50. Thus, the handle is a universal handle which provides 2° of freedom with respect to the bearing surface. The handle holder 60 includes a cavity 62 at its upright end which includes internal thread 64. The threads 64 mate with the threaded surface of an elongated cylindrical handle 40 which is typically about 4 to about 6 feet, and more preferably about 5 feet plus or minus 3 inches, made from a suitable material such as wood or plastic including one end which is externally threaded to mate with the threads of the handle holder 60. Similarly, the handle may include a threaded portion such as a metal tip which mates with a wooden dowel to make up the long handle. The elongated handle member 40 is comparable to a broom handle and can include on one end a hand-grip such as a texturized rubber portion.

Figure 3:
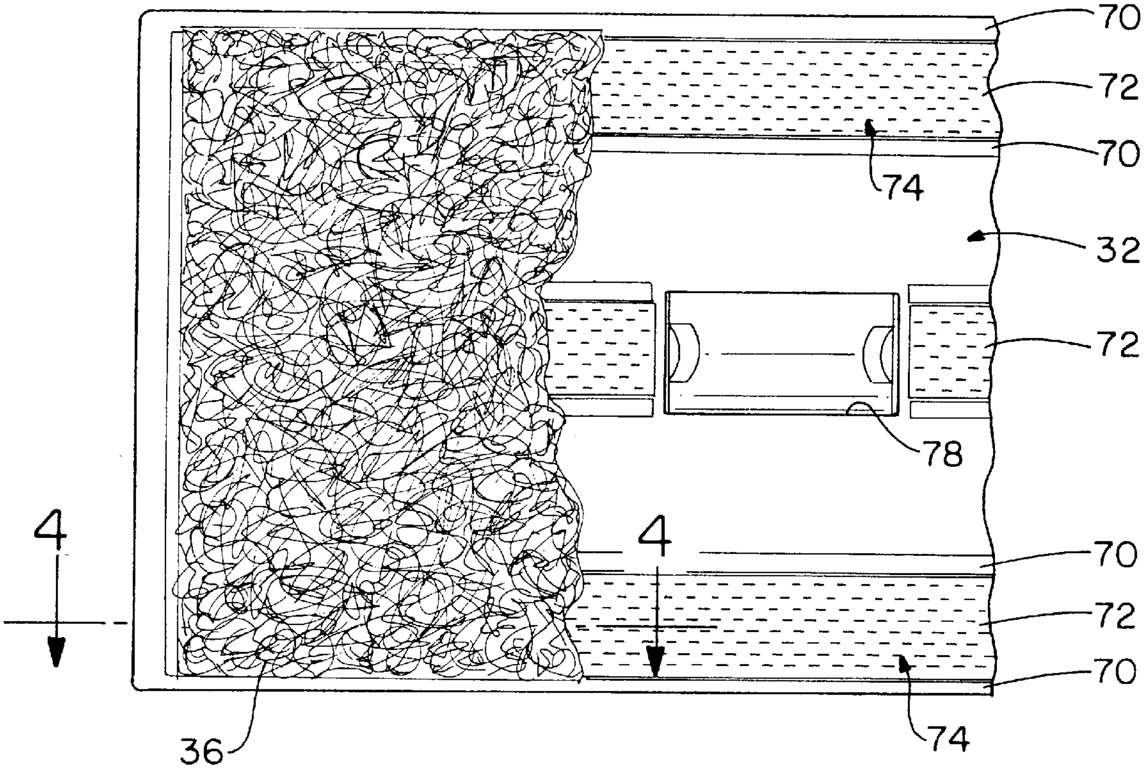
FIG. 3 is a bottom plan view of the scrub pad holder showing a portion of a scrub pad as may be carried by the holder.
Figure 4:
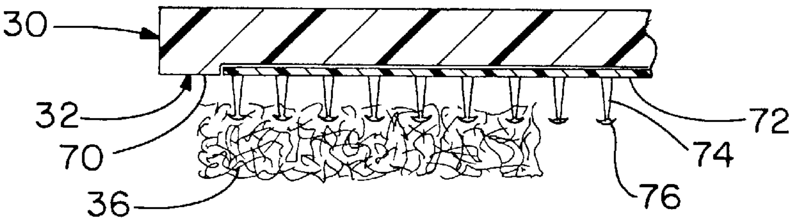
FIG. 4 is a greatly enlarged sectional view as taken at line 4—4 of FIG. 3.

A view of the bearing surface and the retaining cleats is shown in FIGS. 3 and 4. FIG. 3 illustrates a bottom view of the bearing surface with the scrub pad cut away. In particular, the surface includes longitudinally extending stiffening ribs 70 which define shallow recesses which receive a tape member 72 including retaining cleats 74 having barbed edge members 76 which retain the fibrous pad 36. Typically, three strips are used which include an adhesive which retains the strip member 72 to the bottom of the bearing surface member 32. The bearing surface further includes a rectangular cut-out 78 where the brackets extend upwards of the bearing surface 32.

In accordance with the method utilizing the second embodiment of the scrub pad holder, a roofer may stand and grip a scrub pad applicator by the elongated handle and lower the fibrous scrub pad 36 into a bucket of primer in order to saturate the pad. The roofer may proceed while standing to scrub and prime in the area to be adhered using the scrub pad applicator and by bearing down on the applicator by pressing the handle toward the surface to be primed in a standing position. Thus, the roofer does not need to be on his hands and knees to apply the primer.

Figure 7:
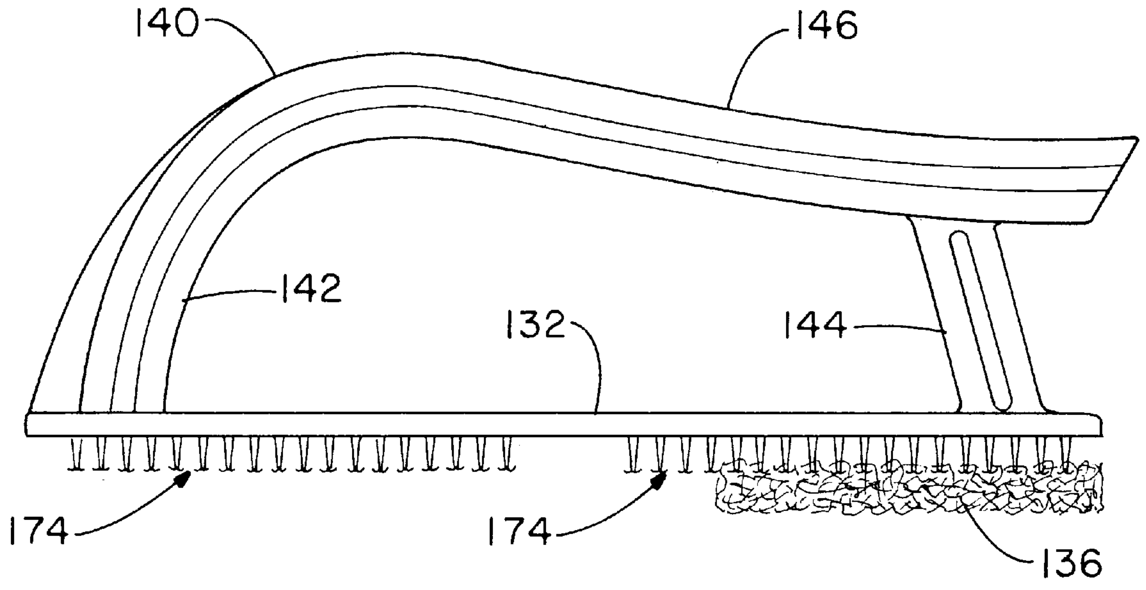
FIG. 7 is a side elevational view of a second embodiment for a scrub pad holder.

A third embodiment of the scrub pad applicator is shown in FIG. 7 and includes a bearing surface 132 having retaining cleats 174 which cover substantially all of the bottom of the bearing surface. A scrub pad 136 is adhered to the retaining cleats. An applicator handle 140 rises from the bearing surface 132 and includes a front curve portion 142 and a rearward strut 144. The handle 140 may include a textured portion 146 which is vertically spaced from the bearing surface and angled slightly to enable a proper application of pressure to the surface to be primed by the scrub pad member 136.

Tables 1 and 2 include the results of test using standard EPDM membranes of 0.045 gauge, a "QuickPrime" primer having a solid contents 15 to 16 percent and a 3-inch butyl rubber seam tape. The "QuickPrime" primer is applied with a standard "QuickPrime" primer pad and handle and, in addition, with a pad and elongated handle, the results of the peel and sheer test are shown in Table I. The symbol "A" stands for adhesive failure; "C" stands for cohesive failure; "pli" is pounds per linear inch; and "psi" is pounds per square inch. The results demonstrate that substantially similar adhesion can be achieved utilizing the method of roofing wherein the roofer stands and uses a long-handled applicator for the priming operation as when the roofer primes the seam on his knees using a short, hand-held applicator.

TABLE I

PEEL ADHESION

| Condition | Short-Handled Applicator with Pad | | Long-Handled Applicator with Pad | | Expected (pli) |
|---|---|---|---|---|---|
| 24 hr @ RT/RT | 7.954 | A | 7.703 | A | 5.000 |
| 24 hr @ 158/158 | 2.429 | A | 2.004 | A | 3.000 |
| 7d @ RT/RT | 9.615 | A/C | 9.223 | C | 5.500 |
| 7d @ 158/158 | 3.615 | A/C | 3.148 | A | 4.000 |
| 7d @ 158/RT | 9.127 | A/C | 8.212 | C/A | 7.000 |
| 7d @ 158/H20 RT | 9.635 | C | 9.599 | C | 7.000 |
| 7d @ 158 H20/ 1 hr @ −40/−40 | 46.020 | C | 53.095 | C | 25.000 |
| 7d @ 240 in water in sealed vessel | 10.746 | C | 11.469 | C | 8.000 |
| 28d @ 240/RT | 6.909 | A | 7.616 | A | 5.500 |

TABLE II

SHEER ADHESION

| Condition | Short-Handled Applicator with Pad Failure Mode | | Long-Handled Applicator with Pad Failure Mode | | Expected (psi) |
|---|---|---|---|---|---|
| 24 hr @ RT/RT | 20.850 | A | 18.00 | A | 15.000 |
| 24 hr @ 158/158 | 10.825 | A | 10.450 | A | 10.000 |
| 7d @ RT/RT | 29.175 | A/C | 27.175 | C | 20.000 |
| 7d @ 158/158 | 14.400 | A | 14.200 | A | 12.000 |
| 7d @ 158/RT | 33.730 | A/C | 32.950 | A/C | 25.000 |
| 7d @ 158/H20 RT | 35.600 | C | 34.650 | C | 35.000 |
| 7d @ 158 H20/ 1 hr @ −40/−40 | 100.825 | A/C | 105.900 | A/C | 90.000 |
| 7d @ 240 Bomb | 34.550 | A/C | 37.200 | C | 40.000 |
| 28d @ 240/RT | 37.500 | A | 35.700 | A | 20.000 |
| Dead Load, 24 hr @ 158 | FAIL | | FAIL | | |

While in accordance with the patent statutes, a preferred embodiment and best mode has been presented herein, the scope of the invention is not limited thereto, but rather is measured by the scope of the attached claims.

What is claimed is:

1. A process for producing seams joining adjacent roofing membranes, at least one membrane having at least one of upper and lower joinder surfaces, said process comprising the steps of:

applying a primer to said at least one joinder surface by using a filamentary rigid pad having handle means with a bearing surface having a longitudinal axis and a vertically extending handle of at least 3 feet in length to permit the application of a substantially uniform pressure to said joinder surface by said pad, said pad being saturated with said primer, said bearing surface including at least a slight arch along the longitudinal axis so as to allow the bearing surface to be bent into the scrubbing area by the application of pressure through the handle as the handle bears directly on said arch;

contacting a splice tape having an exposed surface with said primed surface, said splice tape comprising a strip of rubber containing rubber tackifiers and said splice tape having an opposed surface previously joined to an adjacent roofing membrane.

2. A process as set forth in claim 1, wherein said handle pivots with respect to said bearing surface.

3. A process as set forth in claim 2, wherein said handle pivots about an axis which is substantially parallel to said bearing surface.

4. A process as set forth in claim 1, wherein said bearing surface includes cleats to retain said filamentary rigid pad.

* * * * *